United States Patent
Chiba et al.

(10) Patent No.: US 8,521,404 B2
(45) Date of Patent: Aug. 27, 2013

(54) FUEL INJECTION APPARATUS FOR INTERNAL COMBUSTION ENGINE

(75) Inventors: Fumito Chiba, Susono (JP); Mamoru Yoshioka, Susono (JP); Takahiro Tsukagoshi, Susono (JP); Ryota Onoe, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/505,666

(22) PCT Filed: Mar. 8, 2010

(86) PCT No.: PCT/JP2010/053767
§ 371 (c)(1),
(2), (4) Date: May 2, 2012

(87) PCT Pub. No.: WO2011/111147
PCT Pub. Date: Sep. 15, 2011

(65) Prior Publication Data
US 2012/0227720 A1    Sep. 13, 2012

(51) Int. Cl.
*F02D 41/06* (2006.01)
(52) U.S. Cl.
USPC ........... 701/107; 701/113; 123/457; 123/468; 123/491
(58) Field of Classification Search
USPC ................. 701/103–105, 107, 113; 123/445, 123/447, 457, 466, 467, 468, 491
See application file for complete search history.

(56) References Cited

U.S. PATENT DOCUMENTS

| | | | |
|---|---|---|---|
| 2008/0092851 A1 | 4/2008 | Arakawa et al. | |
| 2009/0159057 A1 | 6/2009 | Pursifull et al. | |
| 2012/0266843 A1* | 10/2012 | Yoshioka et al. | 123/304 |
| 2012/0318237 A1* | 12/2012 | Tsukagoshi et al. | 123/445 |
| 2012/0318241 A1* | 12/2012 | Onoe et al. | 123/515 |

FOREIGN PATENT DOCUMENTS

| | | |
|---|---|---|
| JP | A-2008-088941 | 4/2008 |
| JP | A-2008-106623 | 5/2008 |
| JP | A-2008-248840 | 10/2008 |
| JP | A-2009-036151 | 2/2009 |
| JP | A-2009-150397 | 7/2009 |
| JP | A-2009-281330 | 12/2009 |

OTHER PUBLICATIONS

Mar. 30, 2010 International Search Report issued in International Patent Application No. PCT/JP2010/053767.

* cited by examiner

*Primary Examiner* — Hai Huynh
(74) *Attorney, Agent, or Firm* — Oliff & Berridge, PLC (57) ABSTRACT

The fuel injection apparatus includes: a fuel injector having a leading end that has an internal space in which fuel is accumulated and has a fuel injection port; and an adsorbent, capable of selectively adsorbing an alcohol component in a blended fuel of gasoline and alcohol, disposed in the internal space. The fuel injection apparatus controls an injection amount from the fuel injector such that an air-fuel ratio is a controlled target air-fuel ratio based on an alcohol concentration of a blended fuel supplied to the fuel injector. In this fuel injection apparatus, a fuel pressure is brought to a predetermined high fuel pressure during cold starting of the internal combustion engine. At this time, an adsorbed amount of alcohol on the adsorbent is estimated and any deviation in the air-fuel ratio of the internal combustion engine is corrected based on the adsorbed amount of alcohol.

8 Claims, 8 Drawing Sheets

100: Starter signal = ON?
102: Acquire coolant temperature at starting.
104: Acquire alcohol concentration ROH$_{Tank}$.
106: Coolant temperature > predetermined value A?
108: ROH$_{Tank}$ > predetermined value B?
110: Acquire and set fuel pressure required at starting.
112: Calculate basic injection amount at starting.
114: Calculate adsorbed amount.
116: Calculate alcohol concentration ROH$_{Inj}$.
118: Calculate corrected injection amount at starting.
120: Perform fuel injection processing.
122: Start determining flag = ON?

FUEL INJECTION APPARATUS FOR INTERNAL COMBUSTION ENGINE

TECHNICAL FIELD

The present invention relates to a fuel injection apparatus for an internal combustion engine.

BACKGROUND ART

Figure 9:
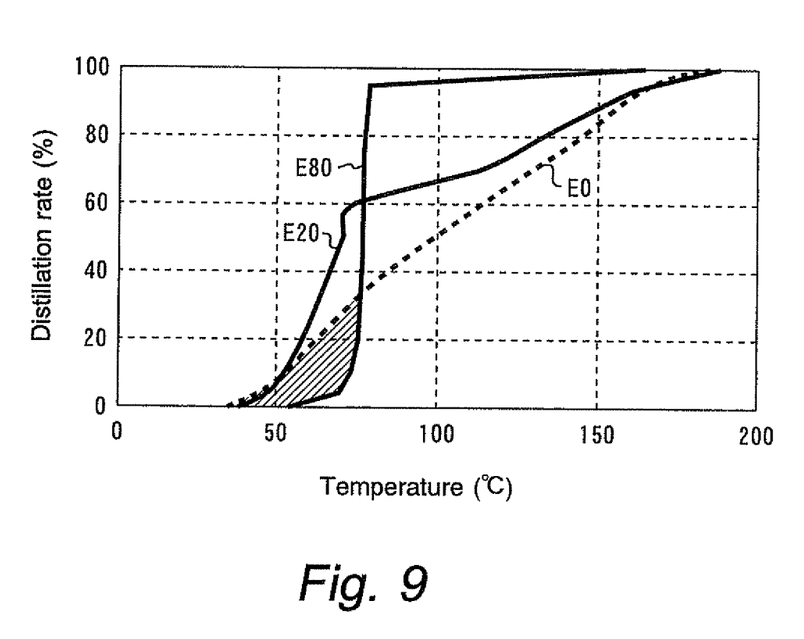
FIG. 9 is a chart showing a relationship between a distillation rate and a temperature of E80, E20, and E0.

A known internal combustion engine can use a blended fuel that is a mixture of gasoline and alcohol such as ethanol or methanol. FIG. 9 is a chart showing a relationship between a distillation rate and a temperature of E80 (a blended fuel with 80% ethanol), E20 (a blended fuel with 20% ethanol), and E0 (100% gasoline). Gasoline is composed of multiple components including one having a low boiling point which contributes to an outstanding vaporization characteristic even at low temperatures. Alcohol, on the other hand, is composed of a single component and thus has a fixed boiling point which is high (about 78° C. for ethanol). As is known from FIG. 9, therefore, a blended fuel having a high concentration of alcohol, such as E80, has a drawback that the fuel is extremely difficult to vaporize at temperatures lower than the boiling point of alcohol. Note that a blended fuel having a relatively low alcohol concentration, such as E20, may actually more readily vaporize than 100% gasoline because of azeotropic phenomenon.

For the reasons as described above, when a blended fuel having a high alcohol concentration is used, substantially only the gasoline component vaporizes of the blended fuel injected from a fuel injector during cold starting of the internal combustion engine, with very little of the alcohol component vaporizing. This results in an insufficient amount of vaporized fuel that contributes to combustion, thus posing a problem of tendency toward poor startability. In addition, the starting relies only on the gasoline component of the blended fuel injected, so that a large amount of fuel needs to be injected at starting in order to compensate for the insufficiency. An amount of alcohol component many times the amount of gasoline component that has contributed to combustion fails to vaporize and burn, flowing past a combustion chamber into an exhaust path in a form of HC. This results in a problem in that the amount of HC discharged into the atmosphere tends to be extremely large during cold starting.

JP-A-2008-248840 discloses an internal combustion engine to which a blended fuel of gasoline and ethanol is supplied, wherein water is added to a fuel tank that accumulates the blended fuel to thereby separate and extract ethanol water from the blended fuel, and alcohol water is allowed to be injected into an intake port during heavy load operation. The internal combustion engine includes: a main tank that communicates with a gasoline injection valve; and a sub-tank that communicates with an ethanol water injection valve. The main tank accumulates residual fuel (gasoline) to which water has been added, and the sub-tank accumulates the separated ethanol water. Being able to inject gasoline or ethanol water at any desired timing, the internal combustion engine can solve the foregoing problem.

PRIOR ART DOCUMENTS

Patent Documents

Patent Document 1: JP-A-2008-248840
Patent Document 2: JP-A-2009-150397

SUMMARY OF THE INVENTION

Problem to be Solved by the Invention

The related art technique, however, requires two separate fuel supply systems, each including a fuel injector, a delivery pipe, and a fuel path, one for gasoline injection and the other for alcohol injection. This substantially doubles the cost, weight, and space requirements of the fuel supply systems, leading to a significantly increased cost, aggravated fuel economy due to the increased weight, and aggravated mountability.

The present invention has been made to solve the foregoing problems and it is an object of the present invention to provide a fuel injection apparatus for an internal combustion engine using a blended fuel of gasoline and alcohol, capable of inhibiting, with a simple structure, emissions from being aggravated during use of the blended fuel.

Means for Solving the Problem

In accomplishing the above object, according to a first aspect of the present invention, there is provided a fuel injection apparatus for an internal combustion engine including: a fuel injector having a leading end portion that has an internal space in which fuel is accumulated and an injection port for injecting fuel; and an adsorbent disposed in the internal space, the adsorbent being capable of selectively adsorbing an alcohol component in a blended fuel of gasoline and alcohol, the fuel injection apparatus controlling an injection amount from the fuel injector such that an air-fuel ratio of the internal combustion engine is a control target air-fuel ratio based on an alcohol concentration (hereinafter referred to as a first alcohol concentration) of a blended fuel supplied to the fuel injector, the adsorbent having a characteristic that an adsorbed amount of alcohol is small when a fuel pressure is low and large when the fuel pressure is high, the fuel injection apparatus comprising:

means for determining whether or not there is a requirement for an alcohol concentration of fuel injected from the fuel injector (hereinafter referred to as a second alcohol concentration) to be lower than the first alcohol concentration;

means for changing the fuel pressure to a predetermined high fuel pressure when it is determined that there is the requirement;

means for estimating an adsorbed amount of alcohol on the adsorbent; and means for correcting any deviation in an air-fuel ratio of the internal combustion engine based on the adsorbed amount of alcohol.

According to a second aspect of the present invention, there is provided the fuel injection apparatus as described in the first aspect, wherein:

the adsorbed amount estimating means estimates the adsorbed amount of alcohol based on a fuel pressure and a fuel temperature inside the internal space.

According to a third aspect of the present invention, there is provided the fuel injection apparatus as described in the first or second aspect, wherein:

the correcting means includes means for estimating the second alcohol concentration based on the adsorbed amount of alcohol and corrects a change in the air-fuel ratio corresponding to a reduction of the second alcohol concentration relative to the first alcohol concentration by increasing or decreasing the injection amount.

According to a fourth aspect of the present invention, there is provided the fuel injection apparatus as described in the third aspect, wherein:

the concentration estimating means estimates the second alcohol concentration based on the adsorbed amount of alcohol and the first alcohol concentration.

According to a fifth aspect of the present invention, there is provided the fuel injection apparatus as described in any one of the first to fourth aspects, wherein:

the determining means includes means for acquiring a coolant temperature of the internal combustion engine and determines that there is the requirement when the coolant temperature is lower than a predetermined value.

According to a sixth aspect of the present invention, there is provided the fuel injection apparatus as described in any one of the first to fifth aspects, wherein:

the determining means determines that there is the requirement when the internal combustion engine is started.

According to a seventh aspect of the present invention, there is provided the fuel injection apparatus as described in any one of the first to sixth aspects, further comprising:

means for determining that the adsorbed amount of alcohol is saturated; and means for limiting performance by the correcting means when the adsorbed amount of alcohol is determined to be saturated.

Effects of the Invention

In the fuel injector of the present invention, the adsorbent that is capable of selectively adsorbing an alcohol component from the blended fuel of gasoline and alcohol is disposed in the internal space of a leading end portion of the injector. The fuel injector of the present invention can therefore reduce the alcohol concentration of the fuel to be injected immediately whenever necessary (e.g. during cold starting). Since the foregoing effect can be achieved without having a fuel injector for exclusive use for alcohol, the fuel supply system can be simplified for reduction in cost and weight.

In the first aspect of the present invention, when there is a requirement for reducing the alcohol concentration of the fuel to be injected from the fuel injector, fuel with a reduced alcohol concentration is injected to respond to the requirement. Note that, in an internal combustion engine, an air-fuel ratio control is performed based on the alcohol concentration of the blended fuel supplied to the fuel injector (the first alcohol concentration). If the alcohol concentration of the fuel injected from the fuel injector (the second alcohol concentration) is reduced to a level lower than the first alcohol concentration, therefore, the air-fuel ratio of the internal combustion engine deviates from the controlled target air-fuel ratio. In addition, a change in the alcohol concentration of the blended fuel results in a change in a stoichiometric air-fuel ratio of the blended fuel. In the first aspect of the present invention, the deviation in the air-fuel ratio of the internal combustion engine is corrected based on the adsorbed amount of alcohol on the adsorbent. According to the present invention, therefore, aggravation of emissions arising from the deviation in the air-fuel ratio can be effectively inhibited even if the alcohol component is adsorbed onto the alcohol adsorbent.

In the second aspect of the present invention, the adsorbed amount of alcohol on the adsorbent is correlated with the fuel pressure and the fuel temperature inside the internal space in which the adsorbent is disposed. According to the present invention, therefore, the adsorbed amount of alcohol can be accurately estimated based on these state quantities.

In the third aspect of the present invention, the change in the air-fuel ratio due to a reduced second alcohol concentration is corrected by increasing or decreasing the fuel injection amount. According to the present invention, therefore, the air-fuel ratio of the internal combustion engine can be brought to the controlled target air-fuel ratio even if the alcohol component is adsorbed onto the alcohol adsorbent.

In the fourth aspect of the present invention, the second alcohol concentration is estimated based on the estimated adsorbed amount of alcohol and the first alcohol concentration. The adsorbed amount of alcohol on the adsorbent depends on the fuel pressure and the fuel temperature, and not on the first alcohol concentration. Accordingly, the lower the first alcohol concentration, the greater the ratio at which the second alcohol concentration is reduced. According to the present invention, therefore, the second alcohol concentration can be accurately estimated by considering the first alcohol concentration.

In the fifth aspect of the present invention, when the coolant temperature for the internal combustion engine is lower than a predetermined value, it is determined that there is a requirement for reducing the second alcohol concentration to a level lower than the first alcohol concentration. Alcohol has a poor vaporization characteristic at low temperatures. According to the present invention, therefore, a situation in which a large amount of unburned alcohol is discharged to aggravate HC emissions at low temperatures can be effectively inhibited.

In the sixth aspect of the present invention, during starting of the internal combustion engine, it is determined that there is a requirement for reducing the second alcohol concentration to a level lower than the first alcohol concentration. A greater injection amount than normal is required when starting the internal combustion engine. According to the present invention, therefore, a large amount of blended fuel with high alcohol concentrations is injected, which effectively inhibits a situation in which HC emissions are aggravated.

In the seventh aspect of the present invention, correction of the injection amount is limited when the adsorbed amount of alcohol on the adsorbent is saturated. Once the adsorbed amount of alcohol is saturated, the second alcohol concentration is no longer lower than the first alcohol concentration. According to the present invention, therefore, a situation in which emissions are aggravated as a result of performance of unnecessary correction can be effectively avoided.

MODE FOR CARRYING OUT THE INVENTION

Embodiments of the present invention will be described below with reference to the accompanying drawings. In each of the drawings, like or equal elements are identified by the same reference numerals and descriptions therefore will not to be duplicated. The embodiments to be described hereunder are not intended to limit the present invention.

First Embodiment

[Arrangements of the First Embodiment]

Figure 1:
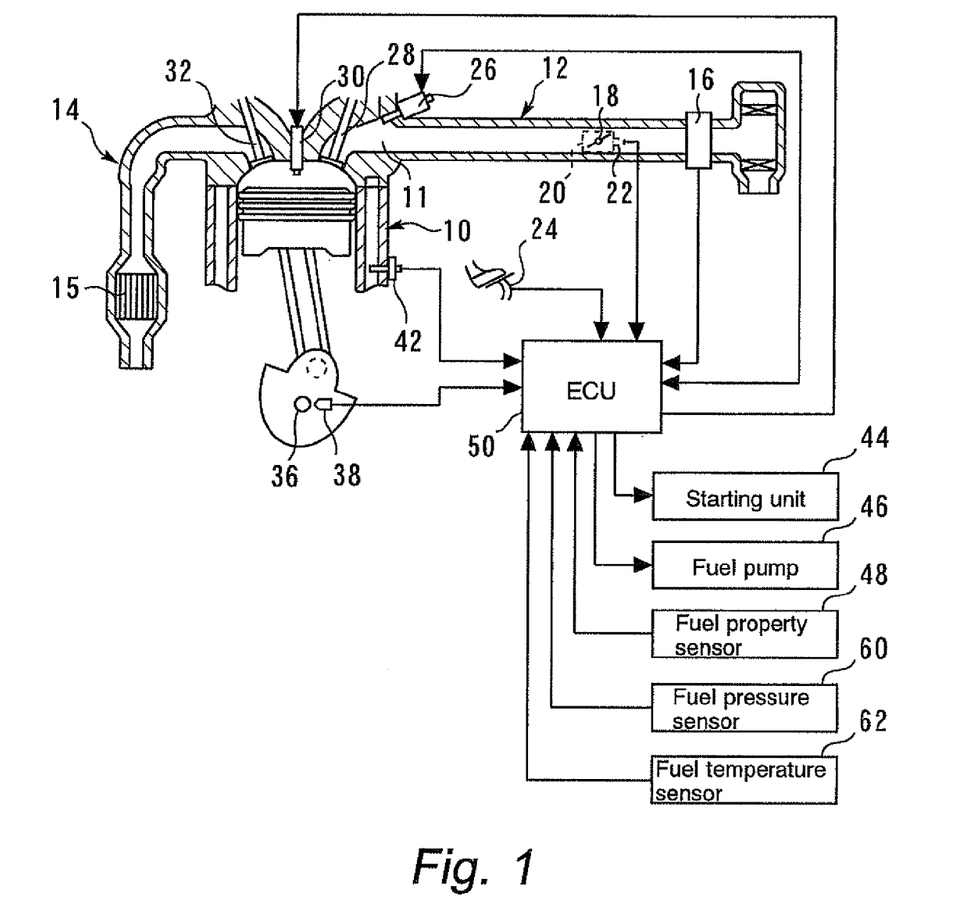
FIG. 1 is a diagram for illustrating a system configuration of a first embodiment of the present invention.

FIG. 1 is a diagram for illustrating a system configuration of a first embodiment of the present invention. Referring to FIG. 1, the system according to this embodiment includes an internal combustion engine 10. The internal combustion engine 10 is used, for example, as a driving power source for a vehicle. The internal combustion engine 10 of this embodiment is an in-line four-cylinder type; however, the number and arrangement of cylinders of the internal combustion engine according to this embodiment are not specifically limited. FIG. 1 is a cross-sectional view of a single cylinder of the internal combustion engine 10.

The internal combustion engine 10 is operable on not only gasoline, but also a fuel that is a mixture composed of gasoline and ethanol, methanol, or other type of alcohol (hereinafter referred to also as an "alcohol-blended fuel" or a "blended fuel"). In this case, the alcohol-blended fuel may range from one having a low concentration (e.g. about several percent) of an alcohol component (ratio of the alcohol component) to one having a high concentration (e.g. 80% or more).

The internal combustion engine 10 is connected with an intake path 12 and an exhaust path 14. An air flow meter 16 for detecting an intake air amount is disposed on the intake path 12. A throttle valve 18 is disposed downstream of the air flow meter 16. The throttle valve 18 has an opening adjusted by operation of a throttle motor 20. A throttle position sensor 22 for detecting the opening of the throttle valve 18 is disposed near the throttle valve 18. A catalyst 15 for purifying an exhaust gas is disposed on the exhaust path 14.

A fuel injector 26 for injecting fuel into an intake port 11 is disposed at each cylinder of the internal combustion engine 10. In addition, an intake valve 28, an ignition plug 30, and an exhaust valve 32 are disposed on each cylinder of the internal combustion engine 10.

A crank angle sensor 38 capable of detecting a rotational angle of a crankshaft 36 (crank angle) is disposed near the crankshaft 36 of the internal combustion engine 10. The crank angle sensor 38 can detect the crank angle and a speed of the internal combustion engine 10.

The system of this embodiment generally includes an accelerator position sensor 24, a coolant temperature sensor 42, a starting unit 44, a fuel pump 46, a fuel property sensor 48, a fuel pressure sensor 60, a fuel temperature sensor 62, and an ECU (electronic control unit) 50. Specifically, the accelerator position sensor 24 detects an amount of depression of an accelerator pedal on a driver's seat side of the vehicle on which the internal combustion engine 10 is mounted. The coolant temperature sensor 42 detects a coolant temperature of the internal combustion engine 10. The starting unit 44 includes a motor for rotatably driving the crankshaft 36 at starting of the internal combustion engine 10. Sensors and actuators of various types including the above are electrically connected to the ECU 50.

Figure 2:
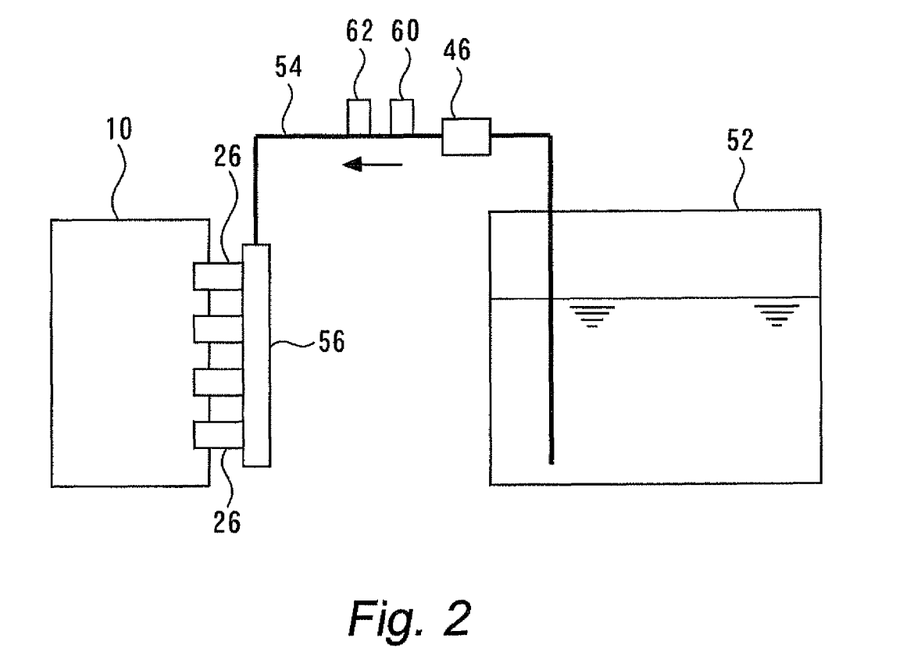
FIG. 2 is an illustration showing schematically a fuel system that supplies the internal combustion engine with fuel.

FIG. 2 is an illustration showing schematically a fuel system that supplies the internal combustion engine 10 with fuel. Referring to FIG. 2, the system of this embodiment includes a fuel tank 52. The fuel tank 52 is connected to a delivery pipe 56 via a fuel supply path 54. The fuel pump 46 that pressurizes fuel is disposed midway in the fuel supply path 54. This is, however, not the only possible location at which to dispose the fuel pump 46; rather, the fuel pump 46 may be disposed, for example, inside the fuel tank 52. The fuel pressure sensor 60 for detecting pressure of the fuel and the fuel temperature sensor 62 for detecting the temperature of the fuel are disposed downstream of the fuel pump 46.

Fuel accumulated in the fuel tank 52 is pressurized by the fuel pump 46 and sent to the delivery pipe 56 through the fuel supply path 54. The delivery pipe 56 distributes fuel to the fuel injector 26 of each cylinder. The fuel pump 46 is adapted to be able to send fuel to the delivery pipe 56 by regulating a fuel pressure to a value commanded by the ECU 50. Specifically, in the system of this embodiment, the fuel pressure inside the fuel injector 26 (specifically, a fuel injection pressure) is adjustable with the fuel pump 46.

Concentration of alcohol in fuel to be supplied to the fuel injector 26, specifically, fuel accumulated in the fuel tank 52 (hereinafter referred to as "in-tank fuel") increases or decreases according to the alcohol concentration of fuel selected for refueling by a user. In this embodiment, the alcohol concentration of the in-tank fuel can be detected by the fuel property sensor 48 disposed midway in the fuel supply path 54. For the fuel property sensor 48, a type of sensor may be used that detects the alcohol concentration by, for example, measuring dielectric constant or refractive index of the fuel. The position at which the fuel property sensor 48 is disposed in the figure is not the only possible arrangement. For example, the fuel property sensor 48 may be disposed in the fuel tank 52 or on the delivery pipe 56. Further, in the present invention, the method for detecting the alcohol concentration of the in-tank fuel is not limited to one using the fuel property sensor 48. For example, the alcohol concentration of the fuel may be detected (estimated) from a learned value in an air-fuel ratio feedback control. Specifically, the gasoline and the alcohol have different stoichiometric air-fuel ratio values, so that the stoichiometric air-fuel ratio value of the alcohol-blended fuel varies depending on the alcohol concentration. This allows the alcohol concentration of the in-tank fuel to be detected (estimated) based on the stoichiometric air-fuel ratio value learned using a signal fed back from an air-fuel ratio sensor (not shown) disposed in the exhaust path 14.

Figure 3:
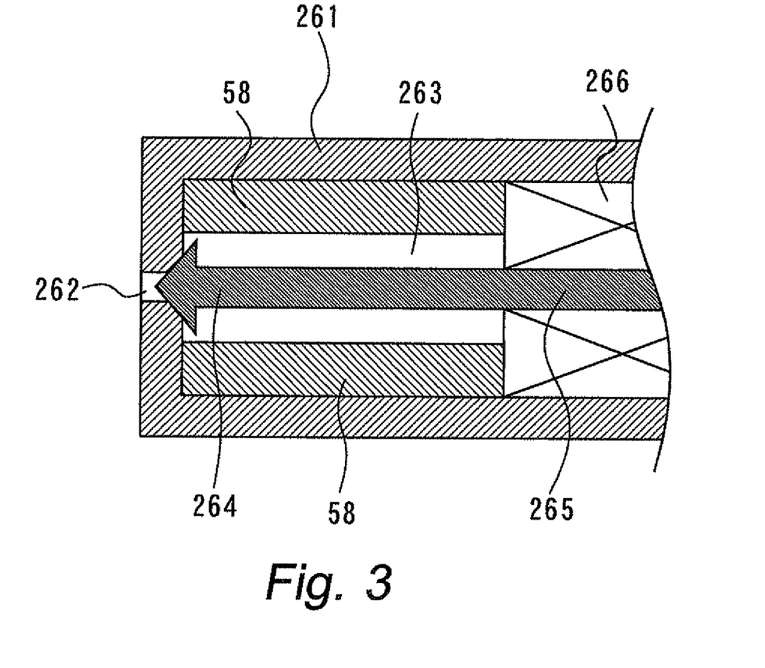
FIG. 3 is an enlarged cross-sectional view showing a leading end portion of the fuel injector.

FIG. 3 is an enlarged cross-sectional view showing a leading end portion of the fuel injector 26 included in the internal combustion engine 10 of this embodiment. Referring to FIG. 3, the fuel injector 26 has a leading end portion 261. The leading end portion 261 includes an injection port 262 for injecting fuel and an internal space 263 in which fuel is accumulated (filled with fuel). A needle valve 264 as an injection valve is passed through the internal space 263. The needle valve 264 opens and closes the injection port 262. A plunger 265 is integrally formed on a proximal end side of the needle valve 264. A solenoid coil 266 is disposed around the plunger 265. When the solenoid coil 266 is energized, the plunger 265 is pulled in the solenoid coil 266, so that the plunger 265 and the needle valve 264 move to the proximal end side, which opens the injection port 262. This allows fuel in the internal space 263 to be injected from the injection port 262. When the solenoid coil 266 is de-energized, the plunger 265 and the needle valve 264 are brought back to their original positions by an urging force of a spring not shown. This closes the injection port 262 to stop injection. Such a fuel pressure in the internal space 263 of the fuel injector 26 (hereinafter referred to also simply as the "fuel pressure") can be controlled to vary from low to high by a command issued from the ECU 50 to the fuel pump 56 as described earlier.

An adsorbent 58 is disposed in the internal space 263 at the leading end portion 261 of the fuel injector 26. According to the arrangement shown in the figure, the adsorbent 58 is disposed in a tubular form along an inner periphery of the internal space 263. Specifically, the adsorbent 58 is disposed so as to surround an outer peripheral side of the needle valve 264. A type having a property of selectively adsorbing the alcohol component in the alcohol-blended fuel is selected as the adsorbent 58. As a component material of such an adsorbent 58, a highly hydrophilic, porous body having fine pores on a molecule level that can take in alcohol molecules may be used; typically, zeolite is preferably used. Particularly preferably, a type of zeolite having a strong polarity is used. Use of the zeolite having the strong polarity allows alcohol molecules having a strong polarity to be reliably and selectively adsorbed from the fuel containing the gasoline component. Note also that, for example, pore size varies depending on a skeletal structure of the porous body used for the adsorbent 58 (for example, type A, type Y, and type X for zeolite). By selecting an optimum skeletal structure according to the size of the alcohol molecule in question, therefore, a favorable alcohol adsorption property can be obtained. To adsorb ethanol, for example, type A zeolite can be particularly preferably used

[Operations in the First Embodiment]

(Adsorption and Desorption of Alcohol in the Adsorbent)

The adsorbent 58 has a property that the amount of alcohol adsorbed onto the adsorbent 58 (hereinafter referred to as an "adsorbed amount of alcohol") is small when an ambient fuel pressure is low and the adsorbed amount of alcohol is large when the fuel pressure is high. The embodiment utilizes this property to control the adsorbed amount of alcohol on the adsorbent 58, thereby allowing the alcohol concentration of the fuel injected from the fuel injector 26 to be lower than that of the fuel supplied thereto (specifically, the in-tank fuel). Specifically, when the fuel pressure is increased from a low pressure state in which the adsorbed amount of alcohol is small to a high pressure state in which the adsorbed amount of alcohol is large, the alcohol component of the blended fuel resident in the internal space 263 is selectively adsorbed onto the adsorbent 58. This results in a decreased alcohol concentration of the blended fuel resident in the internal space 263, and an increased gasoline concentration thereof. By increasing the fuel pressure and injecting fuel from the fuel injector 26, therefore, the alcohol concentration of the fuel injected from the fuel injector 26 can be made lower than the alcohol concentration of the in-tank fuel.

Figure 4:
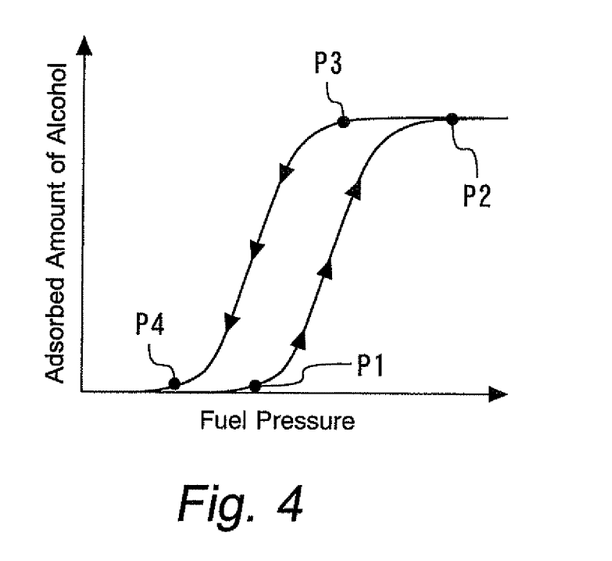
FIG. 4 is a graph showing a relationship between the fuel pressure and the adsorbed amount of alcohol on the adsorbent.

FIG. 4 is a graph showing a relationship between the fuel pressure and the adsorbed amount of alcohol on the adsorbent 58. As described earlier, the adsorbed amount of alcohol is small when the fuel pressure is low and large when the fuel pressure is high. Additionally, the adsorbed amount of alcohol has a hysteresis relative to a history of the fuel pressure as indicated by arrows affixed to curves in FIG. 4. Specifically, the curve on the right in FIG. 4 represents changes in the adsorbed amount of alcohol in a process of the adsorbent 58 adsorbing the alcohol when the fuel pressure is increased from a low pressure to a high pressure. The curve on the left in FIG. 4 represents changes in the adsorbed amount of alcohol in a process of the adsorbent 58 desorbing the adsorbed alcohol when the fuel pressure is decreased from a high pressure to a low pressure.

The ECU 50 can control adsorption of alcohol onto, or desorption of alcohol from, the adsorbent 58 by changing over a value of a set pressure of the fuel pump 46 between a low pressure and a high pressure to thereby vary the fuel pressure in the internal space 263 of the fuel injector 26. The adsorbed amount of alcohol onto the adsorbent 58 is saturated when the fuel pressure rises up to P2 in FIG. 4. Consequently, the fuel pressure is preferably set to more than P2 when the alcohol is to be adsorbed by the adsorbent 58. This allows an alcohol adsorption ability of the adsorbent 58 to be fully extracted. Note, however, that alcohol can be adsorbed onto the adsorbent 58 with a fuel pressure of P1 or more in FIG. 4. To let alcohol be adsorbed onto the adsorbent 58, therefore, the fuel pressure has only to be increased to a value higher than at least P1.

When the fuel pressure is decreased from a condition in which the adsorbed amount of alcohol onto the adsorbent 58 is saturated, substantially no amount of alcohol is desorbed from the adsorbent 58 with a pressure of up to P3 in FIG. 4. When the fuel pressure is lower than P3, desorption of alcohol from the adsorbent 58 is quickly started and, when the pressure is decreased to P4 in FIG. 4, the adsorbed amount of alcohol is substantially zero. To desorb alcohol from the adsorbent 58, therefore, the fuel pressure is preferably set to a value of P4 or lower. This allows a substantially whole amount of alcohol adsorbed onto the adsorbent 58 to be desorbed therefrom. Note, however, that the desorption of alcohol starts with a fuel pressure of P3 in FIG. 4 as described above. To let alcohol be desorbed from the adsorbent 58, therefore, the fuel pressure has only to be decreased down to a value less than at least P3.

(Alcohol Concentration Reduction Control During Cold Starting)

Figure 5:
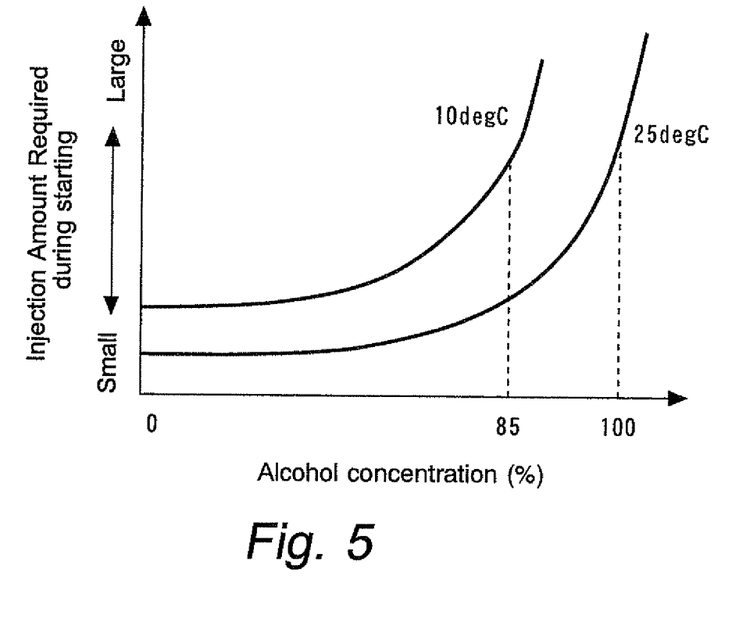
FIG. 5 is a graph for illustrating a relationship between the alcohol concentration and an injection amount required during starting.

An alcohol concentration reduction control during cold starting of the internal combustion engine 10 will be described below with reference to FIG. 5. FIG. 5 is a graph for illustrating a relationship between the alcohol concentration and an injection amount required during starting. As shown in the figure, the injection amount required during starting increases at higher concentrations of alcohol in a temperature range of room temperature or less (25° C. or less). More specifically, the injection amount required during starting increases sharply at an alcohol concentration of near 50 to 60%. This tendency is more conspicuous particularly at low temperatures of 10° C. or less. During cold starting of the internal combustion engine 10, therefore, a large amount of fuel with high concentrations of alcohol is injected, which poses a problem of aggravated HC emissions as a result of discharge of unburned alcohol.

In this embodiment, therefore, control is performed by using the abovementioned function so that, during the cold starting of the internal combustion engine 10, the alcohol concentration of the fuel injected from the fuel injector 26 is lower than the alcohol concentration of the in-tank fuel. This allows fuel with a lower alcohol concentration and a higher gasoline concentration than the in-tank fuel (hereinafter referred to as an "alcohol concentration reduced fuel") to be injected from the fuel injector 26 during the cold starting, even if the alcohol concentration of the in-tank fuel is high. Startability with good combustion can therefore be obtained and a sufficient amount of HC emissions into the atmosphere can be reduced.

In this apparatus in particular, the alcohol concentration reduced fuel can be generated in the internal space 263 disposed immediately before the injection port 262, which allows the alcohol concentration reduced fuel to be injected in the first injection sequence onward during starting. By contrast, in an arrangement in which the alcohol concentration reduced fuel is generated at a position before the fuel injector 26 (for example, the delivery pipe 56), the alcohol concentration reduced fuel can be injected only after the fuel injection sequence is repeatedly performed at least to replace the fuel in the adsorbed amount of alcohol in the fuel injector 26 with the alcohol concentration reduced fuel.

Being able to inject the alcohol concentration reduced fuel in the first injection sequence onward during starting is extremely effective in reducing the amount of HC emissions into the atmosphere for the following reasons. In the beginnings of cold starting, the catalyst 15 is yet to be warmed by the exhaust gas and remains inactive. As a result, most of HC discharged from the internal combustion engine 10 is discharged into the atmosphere without being purified. When combustion thereafter starts in the internal combustion engine 10, the exhaust gas starts flowing into the catalyst 15 to thereby warm the catalyst 15, so that the catalyst 15 starts exhibiting catalytic activity, resulting in HC being purified by the catalyst 15. In order to reduce the amount of HC emissions into the atmosphere during cold starting, therefore, it is extremely important to reduce the amount of HC discharged from the internal combustion engine 10 for the first several cycles during which the catalyst 15 is yet to be warmed. In this respect, this apparatus can inject the alcohol concentration reduced fuel starting with the first injection sequence during starting, so that the amount of alcohol component flowing to the exhaust path 14 without being burned can be reliably reduced. Thus, the amount of HC emissions into the atmosphere during cold starting can be effectively reduced.

When the adsorbed amount of alcohol on the adsorbent 58 is saturated, the adsorbent 58 becomes no longer adsorb alcohol. As a result, the alcohol concentration of fuel injected is brought back to the original level, specifically, the alcohol concentration of the in-tank fuel, through the process of repeated fuel injection sequences performed from the fuel injector 26 after the internal combustion engine 10 has been started. However, the catalyst 15 is warmed enough during the process to exhibit the activity, which starts purification of HC with the catalyst 15. Discharge of HC into the atmosphere can therefore be sufficiently inhibited. Meanwhile, the internal combustion engine 10 is also warmed during a period through which the alcohol concentration of fuel injected from the fuel injector 26 returns to the original level, which promotes vaporization of the alcohol component. Aggravation of driving stability of the internal combustion engine 10 after starting can therefore be sufficiently inhibited.

(Characteristic Operations of the First Embodiment)

Characteristic operations of the first embodiment will be described below. As described earlier, the apparatus of this embodiment is controlled such that, during the cold starting of the internal combustion engine 10, the alcohol concentration of the fuel injected from the fuel injector 26 is lower than the alcohol concentration of the in-tank fuel. Performance of the alcohol concentration reduction control, however, results in a deviation occurring in the air-fuel ratio of the internal combustion engine 10. Specifically, in the internal combustion engine 10, the fuel injection amount is determined on the assumption that the in-tank fuel is injected from the fuel injector 26. If the alcohol concentration reduced fuel is injected from the fuel injector 26, therefore, a deviation occurs in the air-fuel ratio of the internal combustion engine 10.

In this embodiment, therefore, an air-fuel ratio correction control is to be performed when the alcohol concentration reduction control is performed. More specifically, the concentration of the alcohol concentration reduced fuel to be injected from the fuel injector 26 is estimated and, depending on the concentration, the injection amount is increased or decreased as necessary such that the air-fuel ratio of the internal combustion engine 10 is a controlled target air-fuel ratio. This avoids excessive fuel supply, so that HC emissions can be effectively inhibited from being aggravated because of discharge of unburned alcohol.

[Specific Processing Performed in this Embodiment]

Figure 6:
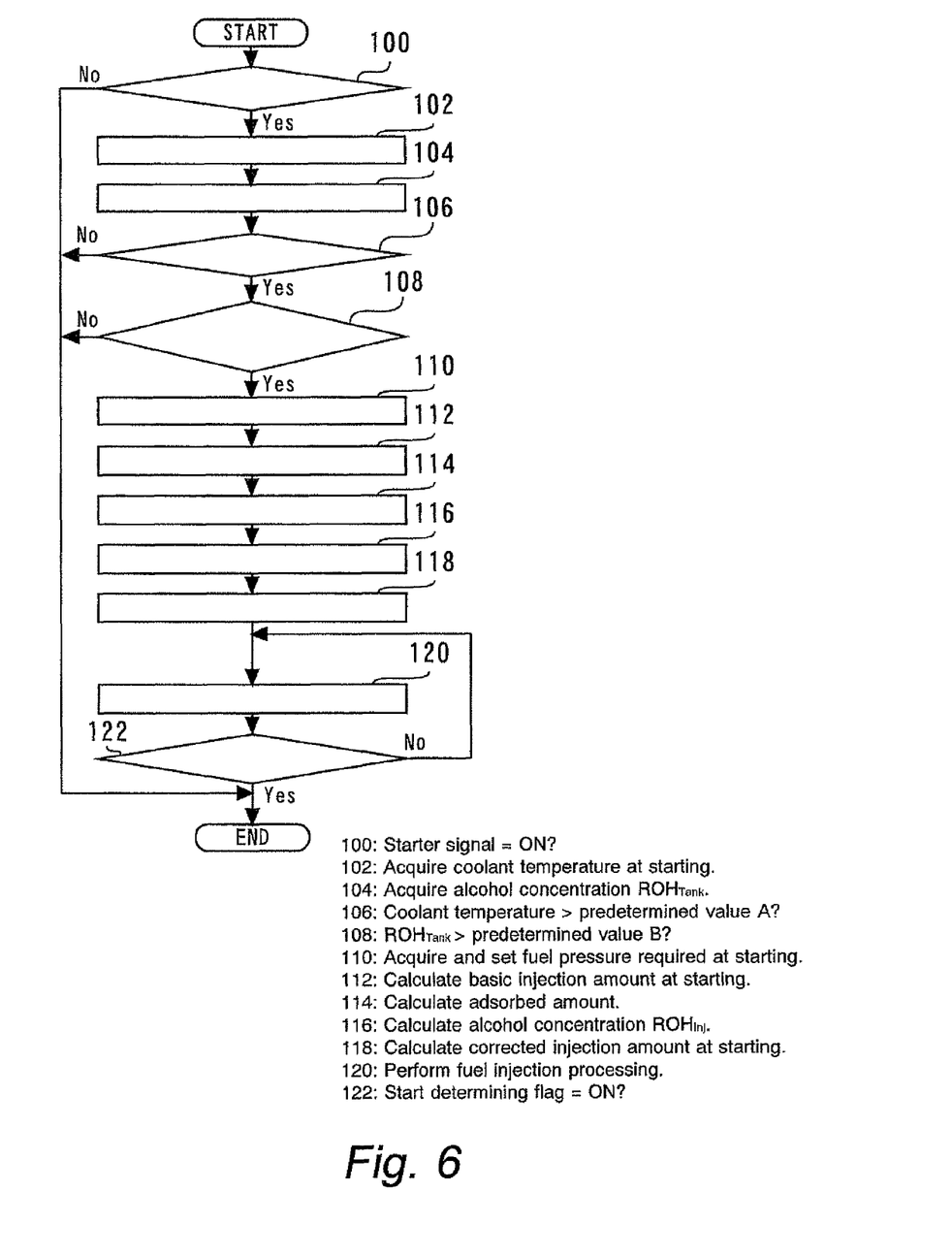
FIG. 6 is a flow chart showing a routine that is executed in accordance with a first embodiment of the present invention.

Specific processing performed in this embodiment will be described below with reference to FIG. 6. FIG. 6 is a flow chart showing a routine performed by the ECU 50 in this embodiment in order to achieve the above-described air-fuel ratio correction. Referring to the routine shown in FIG. 6, it is first determined whether or not a starter signal is ON (step 100). When it is, as a result, determined that the starter signal is not ON, this routine is immediately terminated. When it is determined in step 100, on the other hand, that the starter signal is ON, it is determined that the internal combustion engine 10 is being started and the operation proceeds to the next step in which a coolant temperature Tw of the internal combustion engine 10 at starting as detected by the coolant temperature sensor 42 is acquired (step 102).

Next, an alcohol concentration $ROH_{Tank}$ of the in-tank fuel is acquired (step 104). Specifically, the alcohol concentration of the in-tank fuel as detected by the fuel property sensor 48 is here acquired. It is next determined whether or not the coolant temperature is lower than a predetermined value A (step 106). When, as a result, the coolant temperature Tw<the predetermined value A does not hold, it is then determined that the internal combustion engine 10 is being warm started and it is not likely that startability will be aggravated or HC will be discharged into the atmosphere even if the alcohol concentration of the fuel to be injected is not lowered, so that the routine is immediately terminated.

When, on the other hand, it is determined in step 106 that the coolant temperature Tw<the predetermined value A holds, it is determined that the internal combustion engine 10 is being cold started and the operation proceeds to the next step in which it is determined whether or not the alcohol concentration $ROH_{Tank}$ is greater than a predetermined value B (step 108). When, as a result, the alcohol concentration $ROH_{Tank}$>the predetermined value B does not hold, it is then determined that it is not likely that startability will be aggravated or HC will be discharged into the atmosphere even if the alcohol concentration of the in-tank fuel is not lowered, so that the routine is immediately terminated.

If, on the other hand, it is determined in step 108 that the alcohol concentration $ROH_{Tank}$>the predetermined value B holds, it is then determined that the alcohol concentration of the in-tank fuel needs to be reduced. The operation then proceeds to the next step in which a fuel pressure required at starting is acquired and set (step 110). Specifically, the fuel pressure required at starting is here set to a fuel pressure for reducing the alcohol concentration of fuel to be injected from the fuel injector 26 (hereinafter referred to as "injected fuel"), or to put it another way, a high fuel pressure for the alcohol to be adsorbed onto the adsorbent 58 (hereinafter referred to as a "high fuel pressure").

Next, a basic injection amount at starting is calculated (step 112). Specifically, an injection amount for bringing the air-fuel ratio of the internal combustion engine 10 to the controlled target air-fuel ratio is here calculated based on the alcohol concentration $ROH_{Tank}$ of the in-tank fuel acquired in step 104.

Next, the adsorbed amount of alcohol on the adsorbent 58 is calculated based on a volume of the internal space 263, the fuel temperature, and the fuel pressure (step 114). The ECU 50 stores in memory a map that specifies relationships among the adsorbed amount of alcohol, the volume of the internal space 263, the fuel temperature, and the fuel pressure. Specifically, based on such a map, a desorbed amount of alcohol that corresponds to a current condition of the internal space 263, specifically, the fuel pressure and the fuel temperature detected by the fuel pressure sensor 60 and the fuel temperature sensor 62, respectively, is estimated.

Figure 7:
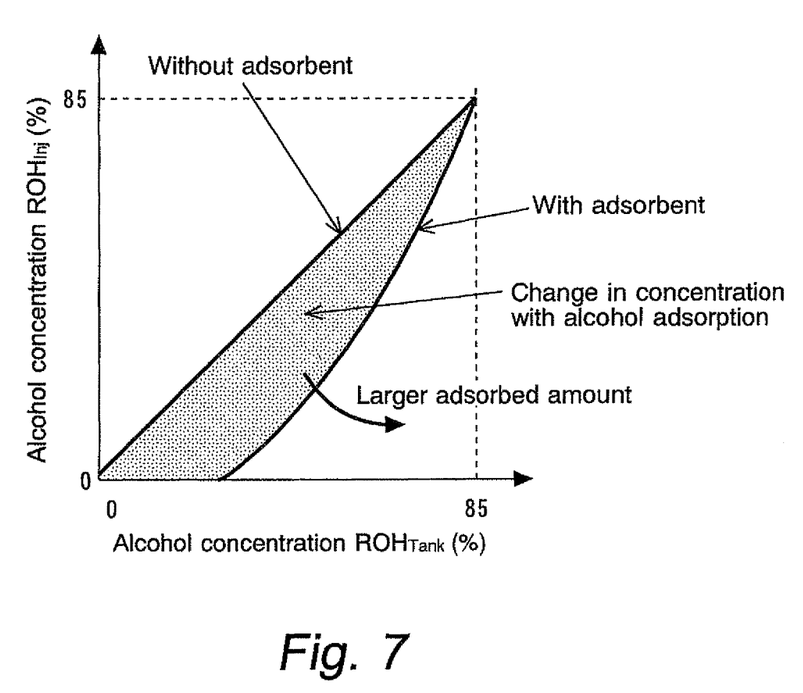
FIG. 7 is a graph for illustrating a relationship between the alcohol concentration $ROH_{Tank}$ of the in-tank fuel and the alcohol concentration $ROH_{Inj}$ of the injected fuel.

Next, an alcohol concentration $ROH_{Inj}$ of the injected fuel is calculated (step 116). FIG. 7 is a graph for illustrating a relationship between the alcohol concentration $ROH_{Tank}$ of the in-tank fuel and the alcohol concentration $ROH_{Inj}$ of the injected fuel. As shown in the figure, the lower a value of the alcohol concentration $ROH_{Tank}$ of the in-tank fuel, the greater a change (amount reduced) in the alcohol concentration $ROH_{Inj}$ of the injected fuel. This shows that, given the same temperature and pressure conditions in the internal space 263, the adsorbed amount of alcohol remains basically constant regardless of the alcohol concentration of the in-tank fuel. The ECU 50 stores in memory the relationship between $ROH_{Inj}$ and $ROH_{Tank}$ for each adsorbed amount of alcohol. Specifically, such a map is here used to calculate the alcohol concentration $ROH_{Inj}$ of the injected fuel that corresponds to the alcohol concentration $ROH_{Tank}$ of the in-tank fuel calculated in step 104 and the adsorbed amount of alcohol calculated in step 114.

Next, a corrected injection amount at starting is calculated (step 118). Specifically, the basic injection amount is here corrected such that the air-fuel ratio of the internal combustion engine 10 is the controlled target air-fuel ratio when the alcohol concentration reduced fuel with a concentration calculated in step 116 is injected.

Next, fuel injection processing is performed (step 120). Specifically, the alcohol concentration reduced fuel is here injected from the fuel injector 26 based on the corrected injection amount at starting calculated in step 118.

Next, it is determined whether or not a start determining flag is ON (step 122). When it is determined as a result that the start determining flag is yet to be ON, it is then determined that the alcohol concentration reduced fuel needs to be injected and the process of step 120 is performed again. When it is determined in step 122 that the start determining flag is ON, it is then determined that, because of the internal combustion engine 10 being warmed up, emissions are not likely to be aggravated even with the use of the in-tank fuel as is and this routine is terminated.

As described heretofore, in the apparatus according to the first embodiment, the deviation in the air-fuel ratio occurring from injection of the alcohol concentration reduced fuel can be effectively corrected during cold starting of the internal combustion engine 10.

In the first embodiment described above, the injection amount is corrected during the cold starting in which the alcohol concentration reduced fuel is injected. Timing when such a correction is made is not, however, limited to the above. Specifically, for example, the alcohol concentration of the injected fuel is reduced by the function of the adsorbent 58 even when the fuel pressure is varied to a high fuel pressure through another control requirement. If the fuel pressure is varied to a high fuel pressure while the internal combustion engine 10 is not being cold started, therefore, it is preferable that the injection amount correction control be performed. This allows the air-fuel ratio of the internal combustion engine 10 to be brought to the controlled target air-fuel ratio, so that the emissions can be effectively inhibited from being aggravated.

Additionally, in the first embodiment described above, the fuel pressure and the fuel temperature detected by the fuel pressure sensor 60 and the fuel temperature sensor 62, respectively, are used when the adsorbed amount of alcohol is to be estimated. The values to be used for such estimation are not limited to those detected values. Specifically, a set fuel pressure may be used in place of the fuel pressure inside the internal space 263 or these state quantities may be estimated by using another well-known technique.

The alcohol concentration $ROH_{Tank}$ of the in-tank fuel in the first embodiment described above corresponds to the "first alcohol concentration" in the first aspect of the present invention, and the alcohol concentration $ROH_{Inj}$ of the injected fuel in the first embodiment corresponds to the "second alcohol concentration" in the first aspect of the present invention. Similarly, performance of step 100, 106, or 108 by the ECU 50 achieves the "determining means" in the first aspect of the present invention, performance of step 110 achieves the "control means" in the first aspect of the present invention, performance of step 114 achieves the "adsorbed amount estimating means" in the first aspect of the present invention, and performance of step 120 achieves the "correcting means" in the first aspect of the present invention.

Similarly, performance of step 116 by the ECU 50 in the first embodiment described above achieves the "concentration estimating means" in the third aspect of the present invention.

Similarly, performance of step 102 by the ECU 50 in the first embodiment described above achieves the "means for acquiring a coolant temperature" in the fifth aspect of the present invention, and performance of step 106 in the first embodiment achieves the "determining means" in the fourth aspect of the present invention.

Similarly, performance of step 100 by the ECU 50 in the first embodiment described above achieves the "determining means" in the sixth aspect of the present invention.

Second Embodiment

[Characteristics of the Second Embodiment]

Figure 8:
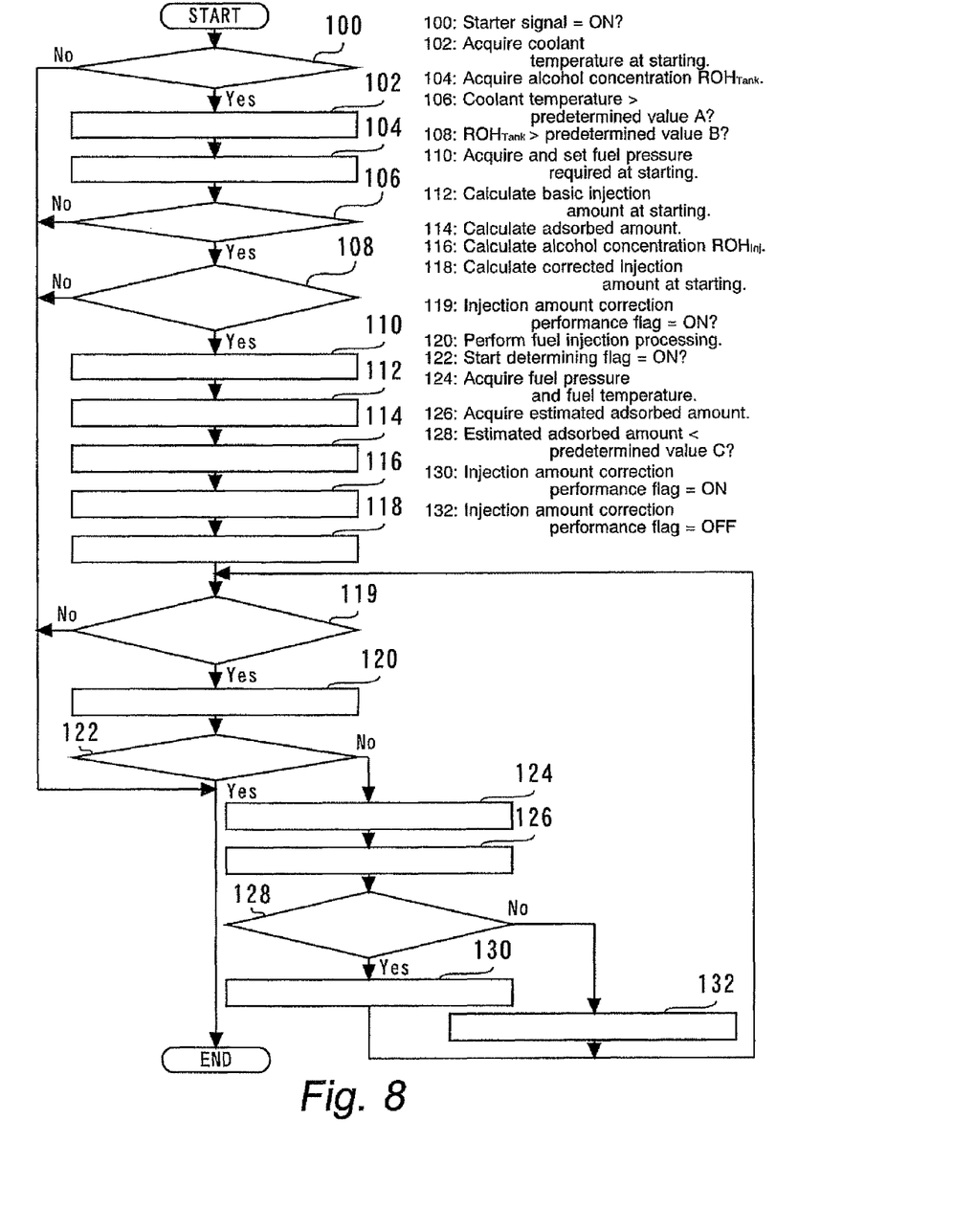
FIG. 8 is a flow chart showing a routine that is executed in accordance with a second embodiment of the present invention.

A second embodiment of the present invention will be described below with reference to FIG. 8. A system according to this embodiment can be achieved by letting an ECU 50 perform a routine shown in FIG. 8 to be described later using the hardware configuration shown in FIG. 1.

When the adsorbed amount of alcohol on the adsorbent 58 is saturated, the adsorbent 58 becomes no longer adsorb alcohol. As a result, the alcohol concentration of fuel injected is brought back to the original level, specifically, the alcohol concentration of the in-tank fuel, through the process of repeated fuel injection sequences performed from the fuel injector 26 after the internal combustion engine 10 has been started. If the adsorbed amount of alcohol on the adsorbent 58 is saturated before the start determining flag is determined to be ON in the injection amount correction in the first embodiment described earlier, therefore, performance of the injection amount correction causes a deviation to occur in the air-fuel ratio.

In the second embodiment, therefore, the above-described injection amount correction is prohibited when the adsorbed amount of alcohol on the adsorbent 58 is saturated. This effectively avoids a situation in which the performance of unnecessary correction aggravates emissions.

[Specific Processing Performed in the Second Embodiment]

Specific processing performed in this embodiment will be described below with reference to FIG. 8. FIG. 8 is a flow chart showing a routine performed by the ECU 50 in this embodiment in order to achieve the above-described function. In the routine shown in FIG. 8, the same processing of steps 100 to 118 as in the routine shown in FIG. 6 is first performed.

Next, it is determined whether or not an injection amount correction performance flag is ON (step 119). The injection amount correction performance flag is set to ON by default. Thus, the operation proceeds to the next step of step 120 in which fuel injection processing is performed based on the corrected injection amount at starting.

Then, in step 122, it is determined whether or not a start determining flag is ON. When it is determined that the start determining flag is ON, it is then determined that, because of the internal combustion engine 10 being warmed up, emissions are not likely to be aggravated even with the use of the in-tank fuel as is and this routine is terminated.

When it is determined in step 122 that the start determining flag is yet to be ON, it is determined that the internal combustion engine 10 is yet to be warmed up. The operation then proceeds to the next step in which the fuel pressure and the fuel temperature of the in-tank fuel detected by the fuel pressure sensor 60 and the fuel temperature sensor 62, respectively, are acquired (step 124). Next, the adsorbed amount of alcohol on the adsorbent 58 is estimated based on the volume of the internal space 263, and the fuel pressure and the fuel temperature acquired in step 124 (step 126).

Next, it is determined whether or not the estimated adsorbed amount acquired in step 126 is smaller than a predetermined value C (step 128). A preset value is read for the predetermined value C as a threshold value for determining whether or not the adsorbed amount of alcohol on the adsorbent 58 is saturated. When, as a result, the estimated adsorbed amount<the predetermined value C holds, it is then determined that the adsorbed amount is yet to be saturated and the operation proceeds to the next step in which an injection amount correction flag is set to ON (step 130). When, on the other hand, the estimated adsorbed amount<the predetermined value C does not hold, it is then determined that the adsorbed amount is saturated and the operation proceeds to the next step in which the injection amount correction flag is set to OFF (step 132).

When the process of either step 130 or 132 is performed, the operation proceeds again to step 119 in which it is determined whether or not the injection amount correction performance flag is ON. When it is determined, as a result, that the injection amount correction performance flag is ON, the fuel injection processing is performed again in step 120. When it is determined in step 119 that the injection amount correction performance flag is OFF, on the other hand, it is then determined that the performance of the fuel injection processing based on the corrected injection amount at starting results in a deviation occurring in the air-fuel ratio and this routine is immediately terminated.

As described heretofore, in the second embodiment, when the adsorbed amount of alcohol on the adsorbent 58 is saturated, the injection amount correction control to be performed during the cold starting of the internal combustion engine 10 is prohibited. This effectively avoids aggravation of emissions as a result of performance of unnecessary correction.

In the second embodiment described above, the fuel pressure and the fuel temperature are acquired based on sensor outputs. This is, however, not the only possible method for acquiring these values. Specifically, as long as the pressure and temperature of the fuel in the internal space 263 of the fuel injector 26 can be acquired, the values may be estimated from, for example, other state quantities or requirement values for the internal combustion engine 10.

In the second embodiment described above, performance of step 128 by the ECU 50 achieves the "saturation determining means" in the seventh aspect of the present invention and performance of step 119 by the ECU 50 achieves the "limiting means" in the seventh aspect of the present invention.

DESCRIPTION OF REFERENCE CHARACTERS 10 internal combustion engine
11 intake port
12 intake path
14 exhaust path
15 catalyst
16 air flow meter
18 throttle valve
24 accelerator position sensor
26 fuel injector
261 leading end portion
262 injection nozzle
263 internal space
264 needle valve
265 plunger
266 solenoid coil
28 intake valve
30 ignition plug
32 exhaust valve
42 coolant temperature sensor
50 ECU
52 fuel tank
54 fuel supply path
56 delivery pipe
58 adsorbent
60 fuel pressure sensor
62 fuel temperature sensor

The invention claimed is:

1. A fuel injection apparatus for an internal combustion engine including: a fuel injector having a leading end portion that has an internal space in which fuel is accumulated and an injection port for injecting fuel; and an adsorbent disposed in the internal space, the adsorbent being capable of selectively adsorbing an alcohol component in a blended fuel of gasoline and alcohol, the fuel injection apparatus controlling an injection amount from the fuel injector such that an air-fuel ratio of the internal combustion engine is a control target air-fuel ratio based on a first alcohol concentration of a blended fuel supplied to the fuel injector, the adsorbent having a characteristic that an adsorbed amount of alcohol is small when a fuel pressure is low and large when the fuel pressure is high, the fuel injection apparatus comprising:

means for determining whether or not there is a requirement for a second alcohol concentration of fuel injected from the fuel injector to be lower than the first alcohol concentration;

means for changing the fuel pressure to a predetermined high fuel pressure when it is determined that there is the requirement;

means for estimating an adsorbed amount of alcohol on the adsorbent; and means for correcting any deviation in an air-fuel ratio of the internal combustion engine based on the adsorbed amount of alcohol.

2. The fuel injection apparatus for the internal combustion engine according to claim 1, wherein:
the adsorbed amount estimating means estimates the adsorbed amount of alcohol based on a fuel pressure and a fuel temperature inside the internal space.

3. The fuel injection apparatus for the internal combustion engine according to claim 1, wherein:
the correcting means includes means for estimating the second alcohol concentration based on the adsorbed amount of alcohol and corrects a change in the air-fuel ratio corresponding to a reduction of the second alcohol concentration relative to the first alcohol concentration by increasing or decreasing the injection amount.

4. The fuel injection apparatus for the internal combustion engine according to claim 3, wherein:
the concentration estimating means estimates the second alcohol concentration based on the adsorbed amount of alcohol and the first alcohol concentration.

5. The fuel injection apparatus for the internal combustion engine according to claim 1, wherein:
the determining means includes means for acquiring a coolant temperature of the internal combustion engine and determines that there is the requirement when the coolant temperature is lower than a predetermined value.

6. The fuel injection apparatus for the internal combustion engine according to claim 1, wherein:
the determining means determines that there is the requirement when the internal combustion engine is started.

7. The fuel injection apparatus for the internal combustion engine according to claim 1, further comprising:
means for determining that the adsorbed amount of alcohol is saturated; and
means for limiting performance by the correcting means when the adsorbed amount of alcohol is determined to be saturated.

8. A fuel injection apparatus for an internal combustion engine including: a fuel injector having a leading end portion that has an internal space in which fuel is accumulated and an injection port for injecting fuel; and an adsorbent disposed in the internal space, the adsorbent being capable of selectively adsorbing an alcohol component in a blended fuel of gasoline and alcohol, the fuel injection apparatus controlling an injection amount from the fuel injector such that an air-fuel ratio of the internal combustion engine is a control target air-fuel ratio based on a first alcohol concentration of a blended fuel supplied to the fuel injector, the adsorbent having a characteristic that an adsorbed amount of alcohol is small when a fuel pressure is low and large when the fuel pressure is high, the fuel injection apparatus comprising:
a device for determining whether or not there is a requirement for a second alcohol concentration of fuel injected from the fuel injector to be lower than the first alcohol concentration;
a device for changing the fuel pressure to a predetermined high fuel pressure when it is determined that there is the requirement;
a device for estimating an adsorbed amount of alcohol on the adsorbent; and
a device for correcting any deviation in an air-fuel ratio of the internal combustion engine based on the adsorbed amount of alcohol.

* * * * *